(12) United States Patent
Boom et al.

(10) Patent No.: US 9,868,347 B2
(45) Date of Patent: Jan. 16, 2018

(54) ADJUSTMENT DEVICE AND METHOD FOR ADJUSTING SHUTOFF ELEMENTS

(71) Applicant: MCi (Mirror Controls International) Netherlands B.V., Woerden (NL)

(72) Inventors: Stephen Alexander George Gustavo Boom, Woerden (NL); Bastiaan Huijzers, Woerden (NL); Erik Alfred Simeon de Vries, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 14/407,139

(22) PCT Filed: Jun. 11, 2013

(86) PCT No.: PCT/NL2013/050414
§ 371 (c)(1),
(2) Date: Dec. 11, 2014

(87) PCT Pub. No.: WO2013/187760
PCT Pub. Date: Dec. 19, 2013

(65) Prior Publication Data
US 2015/0174999 A1    Jun. 25, 2015

(30) Foreign Application Priority Data
Jun. 12, 2012  (NL) ..................... 2008990

(51) Int. Cl.
*B60K 11/08* (2006.01)
*H02K 7/116* (2006.01)
*H02K 11/21* (2016.01)

(52) U.S. Cl.
CPC ............ *B60K 11/085* (2013.01); *H02K 7/116* (2013.01); *H02K 7/1166* (2013.01); *H02K 11/21* (2016.01); *Y02T 10/88* (2013.01)

(58) Field of Classification Search
CPC ....... B60K 11/00; B60K 11/085; B60K 11/08; B60K 11/06; F02M 35/10
(Continued)

(56) References Cited

U.S. PATENT DOCUMENTS

| 1,393,161 A | 10/1921 | Raleigh |
| 2,752,111 A | 6/1956 | Schairer |

(Continued)

FOREIGN PATENT DOCUMENTS

| CN | 2138054 Y | 7/1993 |
| CN | 2694232 Y | 4/2005 |

(Continued)

OTHER PUBLICATIONS

Office Action dated Apr. 24, 2015, from Chinese App No. 2011800558421, with English Translation.
(Continued)

*Primary Examiner* — Dalena Tran
(74) *Attorney, Agent, or Firm* — Swanson & Bratschun, L.L.C.

(57) ABSTRACT

The invention relates to an adjustment device for adjusting shutoff elements of an air inlet of a motor compartment of a motor vehicle between at least a first position in which the air inlet is substantially closed and a second position in which the air inlet is substantially open. The adjustment device comprises a drive unit. The drive unit comprises a drive train, an electric motor with an output shaft for driving the drive train, and a drive shaft. The drive train comprises at least one reduction element. The reduction element, the output shaft of the electric motor, and the output shaft of the adjustment device form drive elements of the drive unit. The adjustment device is provided with a condition determining unit for determining a motion condition of at least one of the drive elements.

8 Claims, 2 Drawing Sheets

Figure 1:
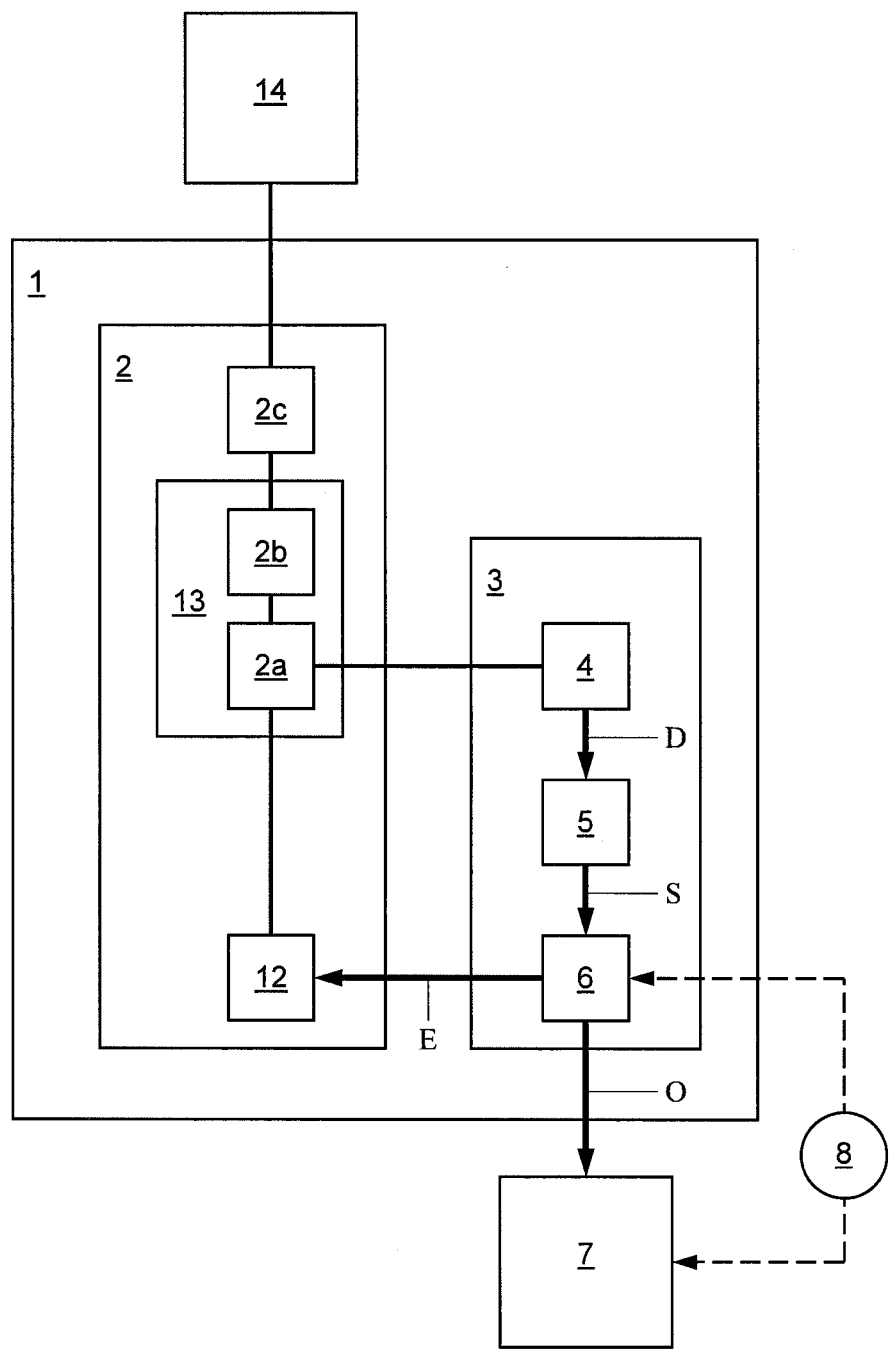

(58) Field of Classification Search
USPC ....... 701/49; 180/68.1; 123/184.21; 454/155
See application file for complete search history.

(56) References Cited

U.S. PATENT DOCUMENTS

| | | | |
|---|---|---|---|
| 4,926,921 A | 5/1990 | Heinemann | |
| 5,732,666 A | 3/1998 | Lee | |
| 6,142,108 A | 11/2000 | Blichmann | |
| 6,145,251 A | 11/2000 | Ricci | |
| 6,565,221 B2 | 5/2003 | Guttenberger | |
| 7,866,737 B2 | 1/2011 | Browne | |
| 8,161,919 B2 | 4/2012 | Klotz | |
| 2002/0056540 A1 | 5/2002 | Mizorogi | |
| 2006/0104074 A1 | 5/2006 | Boniface | |
| 2008/0178526 A1 | 7/2008 | Browne | |
| 2009/0159823 A1* | 6/2009 | Matsunaga | F16K 31/082 251/129.15 |
| 2010/0062895 A1* | 3/2010 | Brouwer | F16H 1/227 475/331 |
| 2011/0232981 A1 | 9/2011 | Hon | |
| 2011/0246023 A1 | 10/2011 | Lockwood | |
| 2012/0012410 A1 | 1/2012 | Hori | |
| 2013/0092462 A1 | 4/2013 | Chinta | |
| 2013/0255599 A1* | 10/2013 | Jentz | F01P 11/14 123/41.1 |
| 2013/0255604 A1* | 10/2013 | Rollinger | F01P 7/048 123/41.15 |

FOREIGN PATENT DOCUMENTS

| | | |
|---|---|---|
| CN | 101247061 A | 8/2008 |
| CN | 101462557 A | 6/2009 |
| CN | 101499695 A | 8/2009 |
| CN | 201350939 Y | 11/2009 |
| CN | 201846183 U | 5/2011 |
| DE | 3506156 | 2/1986 |
| DE | 3438709 | 4/1986 |
| DE | 3522592 | 1/1987 |
| DE | 3701584 | 8/1988 |
| DE | 3731980 C1 | 3/1989 |
| DE | 4020953 | 1/1992 |
| DE | 19719991 | 11/1998 |
| DE | 10047952 | 4/2002 |
| DE | 10218700 | 11/2003 |
| DE | 10307632 | 9/2004 |
| DE | 202005 010683 | 10/2005 |
| DE | 60208158 | 8/2006 |
| DE | 102006042627 | 3/2008 |
| DE | 102007030890 | 1/2009 |
| DE | 102009014003 | 9/2010 |
| DE | 102009035362 | 2/2011 |
| EP | 2233343 | 9/2010 |
| EP | 2248693 | 11/2010 |
| EP | 2325035 | 5/2011 |
| EP | 2371602 | 10/2011 |
| FR | 2738779 | 3/1997 |
| JP | 1986-218713 | 9/1986 |
| JP | 1018744 | 1/1989 |
| JP | 6418744 | 1/1989 |
| JP | 2010/223150 | 7/2010 |
| JP | 2011-79405 | 4/2011 |
| KR | 1001899257 B1 | 6/1999 |
| KR | 10-2004-0097420 | 11/2004 |
| WO | WO 2007/108803 | 9/2007 |
| WO | WO 2007/130847 | 11/2007 |
| WO | WO 2009/091246 A | 7/2009 |
| WO | WO 2012/067502 A1 | 5/2012 |

OTHER PUBLICATIONS

International Search Report, from PCT/NL2012/050524 (WO 2013/012337), dated Oct. 5, 2012.
International Search Report from PCT/NL2013/050414 (WO 2013/187760), dated Jul. 17, 2013.
International Search Report from PCT/NL2011/050766 (WO 2012/067502), dated Dec. 15, 2011.
International Search Report from PCT/NL2013/050482 dated Oct. 25, 2013.
Notice of Allowance from U.S. Appl. No. 14/403,859 dated Jun. 23, 2015.
Office Action from U.S. Appl. No. 13/885,4245 dated Nov. 6, 2015.
Office Action from CN 201280045907.9 dated Nov. 10, 2015.
Office Action from U.S. Appl. No. 13/885,424 dated Jun. 18, 2015.
Office Action from U.S. Appl. No. 13/885,424 dated Nov. 12, 2014.
Office Action from CN App No. 2013800398756 dated Aug. 3, 2016.
CN Search Report from CN App No. 2013800398756 dated Jul. 26, 2016.
Office Action from JP 2013-538679 dated Oct. 26, 2015.
Merkmalsgliederung des Anspruchs 1.
Notice of Opposition from EP 11782253.6 dated May 7, 2015.
Notice of Opposition from EP 11782253.6 dated Jun. 17, 2015.
Office Action from U.S. Appl. No. 14/233,647 dated Nov. 8, 2016.
Office Action from JP 2015-517212 dated Sep. 13, 2016.
Office Action from CN 201280045907.9 dated Jul. 20, 2016.
Office Action from Korean App No. 10-2013-7013416 dated Aug. 5, 2016 with English translation.
Notice of Allowance from U.S. Appl. No. 14/233,647 dated Aug. 9, 2017.

* cited by examiner

ADJUSTMENT DEVICE AND METHOD FOR ADJUSTING SHUTOFF ELEMENTS

RELATED APPLICATIONS

This application is a 35 U.S.C. §371 national phase application of PCT/NL2013/050414 (WO 2013/187760), filed on Jun. 11, 2013, entitled "Adjustment Device and Method for Adjusting Shutoff Elements", which application claims the benefit of Netherlands Application No. 2008990, filed Jun. 12, 2012, which is incorporated herein by reference in its entirety.

The invention relates to an adjustment device for adjusting shutoff elements of an air inlet of a motor compartment of a motor vehicle. It is generally known to provide a motor vehicle, e.g., a car, truck, and the like, with an air inlet comprising one or more air inlet openings. An air inlet is commonly used to cool the motor of the motor vehicle during operation. Air inlets are usually situated at a front of the motor vehicle in front of the motor, for instance at the grille of the vehicle and/or under the front bumper of the vehicle. Air inlet openings may also be situated in the side of the motor vehicle.

It is customary to cool a motor by means of a coolant, for example, water or oil. This coolant is cooled with air in a heat exchanger, for instance in a radiator. The air flowing through the air inlet can be wholly or partly guided to the radiator of the motor compartment of the motor of the motor vehicle to cool the motor indirectly via the coolant.

It is known for an air inlet of a motor compartment to be made of adjustable design, whereby the air inlet can be adjusted between an open position and a closed position.

In the closed position of the air inlet the air resistance of the vehicle is lowered, which is advantageous to the fuel consumption of the motor. In addition, where the efficiency of the motor, fuel consumption and $CO_2$ emission are concerned, a motor of a motor vehicle has an optimum operating temperature, which is generally higher than the ambient temperature. A closed air inlet when the motor is cold is then once again advantageous to fuel consumption and/or $CO_2$ emission. Also, during driving with an open air inlet, the temperature of the motor can fall below the optimum operating temperature, so that fuel consumption and/or $CO_2$ emission may increase. Also at an operating temperature above the optimum operating temperature, fuel consumption and/or $CO_2$ emission of the motor may increase.

It can hence be advantageous to make an air inlet opening of adjustable design. To this end, the air inlet is usually coupled with an adjustment device which comprises a drive unit. With the aid of the drive unit the air inlet can be closed and be opened. When in the case of a closed air inlet the operating temperature and/or the $CO_2$ emission of the motor run(s) up too high, the air inlet can be opened again to provide for sufficient cooling.

The adjustment device usually comprises drive elements and is usually connected with the shutoff elements through an output shaft to thus adjust the shutoff elements between the open position and the closed position. When the open position or the closed position is reached, however, the current supply to the electric motor remains open. It is then of importance to shut off the current supply to prevent damage of the electric motor.

An applied method of preventing damage of the electric motor is described in EP 2 325 035, whereby the adjusting current of the electric motor is monitored. When the adjusting current reaches a preset value, this indicates that the end position has been reached, and the supply current to the electric motor is shut off. A disadvantage of this method is that the adjusting current depends on all kinds of ambient factors, such as the temperature, humidity, etc. Also, the adjusting current may differ among electric motors mutually. In addition, the make-up of the adjustment device and/or the drive unit may be of influence on the adjusting current. This makes measuring the adjusting current a rather unreliable method of preventing damage of the electric motor by overloading upon reaching the end position.

Also, it is sometimes desirable to be able to bring the shutoff elements to a predetermined intermediate position, this intermediate position being between the open position and the closed position, for instance to be able to accurately dose the cooling of the motor of the vehicle in order to be able to approximate the optimum operating temperature of the motor of the motor vehicle.

An applied method of fixing the shutoff elements in a predetermined intermediate position is by making use of a stepping motor. By controlling the number of steps, the desired predetermined intermediate position can be reached. A disadvantage of this method, however, is that stepping motors are relatively costly.

An object of the invention is to provide an adjustment device that counteracts at least one of the above-mentioned disadvantages. In particular, there is a need for a relatively reliable manner of preventing any damage by overloading of the electric motor. Further, there is a need for an adjustment device that can bring the shutoff elements to a predetermined intermediate position in an economically favorable manner.

To this end, the invention provides an adjustment device for adjusting shutoff elements of an air inlet of a motor compartment of a motor vehicle between at least a first position in which the air inlet is substantially closed and a second position in which the air inlet is substantially open; wherein the adjustment device is provided with a drive unit comprising drive elements, wherein the adjustment device is furthermore provided with a condition determining unit for determining a motion condition of at least one of the drive elements.

By providing a condition determining unit which determines the motion condition of the at least one drive element, indirectly the motion condition of the shutoff elements can be determined. For instance, it can thus be determined whether the shutoff elements are in the first position or in the second position or in an intermediate position. When the shutoff elements are in the first position or in the second position, the supply current to the adjustment device and thus to the electric motor can be switched off. Overloading of the electric motor can thus be reduced, so that damage by overloading of the electric motor can be reduced. As a result, the electric motor can have a longer life.

Also when the shutoff elements are in a desired intermediate position, the supply current to the adjustment device and hence to the electric motor can be switched off, so that the shutoff elements remain in the desired intermediate position. As a result, the air inlet can provide for accurately dosed cooling.

The shutoff elements can be shutoff strips, such as, for instance, upright or lying elements pivotable about their longitudinal axis, or can also form ring blinds or can form rollable and/or foldable elements which are adjustable. Many variants of shutoff elements are possible and are understood to be within the scope of the claims.

By determining the motion condition, for instance the position, of the respective drive element, the motion condition, for instance the position, of the shutoff elements can be determined in a reliable manner. The position of the shutoff element can concern, for instance, a position (understood to cover attitude) or an angular displacement, etc. The position can be, for instance, the first position or the second position or an intermediate position of the shutoff elements.

The relation between the position of the drive element and the position of the shutoff elements is a relatively reliable relation because of the substantially mechanical parts that couple the respective drive element with the shutoff elements. Such a relation can for instance be established experimentally and may then, for instance, be valid also for the same and/or comparable adjustment devices which are coupled with the same and/or comparable shutoff elements. The thus established relation can then be inputted in, for instance, the adjustment device, for instance in the condition determining unit, or in a control element of the condition determining unit and/or the adjustment device may thus be calibrated. Alternatively or additionally, a central control unit for controlling the adjustment device, for instance a board computer or a motor management unit of a vehicle, can thus be calibrated and/or the relation mentioned can be inputted in it.

The drive unit usually comprises an electric motor and a drive train which is driven by the electric motor. The drive train in turn has an output drive shaft which can be coupled with the shutoff elements for adjustment of the shutoff elements. The drive train usually comprises at least one reduction element for coupling an output shaft of the electric motor with the output drive shaft of the adjustment device for adjusting the shutoff elements. The drive unit comprises the drive elements, while a reduction element, the electric motor or the output drive shaft of the drive train form drive elements of the adjustment device. Also an output shaft of the electric motor or output shaft of another element can be regarded as drive element. The electric motor is preferably a direct current electric motor, more preferably a direct current brush electric motor, as contrasted to a stepping motor.

The motion condition of the drive element can comprise at least one of a position, a motion velocity, a motion acceleration and/or a motion direction. The position of the drive element can be, for instance, a rotational position, for instance when the drive element is a shaft or a reduction wheel. The position of the drive element is related to the position of the shutoff elements in an advantageous manner, this may possibly even be a directly proportional relation. The motion direction of the drive element is preferably related to the motion direction of the shutoff elements. The motion velocity and the motion acceleration of the drive element preferably provide information about the loading condition of the electric motor. These may therefore be of relevance in determining how heavily the electric motor is loaded and/or whether cut-off of the current supply might be necessary.

The condition determining unit preferably comprises a detectable element, a detection element for detecting the detectable element, and a control element. Advantageously, the condition determining unit, in particular the control element thereof, is calibrated and/or set up once, for instance in the factory after assembly, and/or each time when using, for instance starting, the vehicle. The relation between a motion condition, for instance the position, of the drive element and a motion condition, for instance the position, of the shutoff elements, is preferably configured before commencement of putting into use, more preferably before commencement of the installation, in the control element, for instance by filling in and/or programming and/or configuring parameters. The control element can be, for instance, a CPU which is configured during production and/or the assembly of the condition determining unit.

During operation, the control element receives signals from the detection sensor regarding the motion condition of the drive element. The control element may then be configured such that if the motion condition of the drive element reaches a predetermined position, this corresponds to the first or the second position of the shutoff elements. In that case, the control element can shut off the current supply to the electric motor, so that damage to the electric motor can be limited and/or reduced and the life of the electric motor may be longer. Optionally, the current supply to the electric motor can be shut off after a preset delay time, to thus be more certain that the first or the second position or an intermediate position has been reached.

Alternatively or additionally, it may be so that the control element is configured such that a particular position of the drive element corresponds to a particular intermediate position of the shutoff elements, an intermediate position being a position between the first position and the second position. Thus, also the intermediate positions of the shutoff elements can be known. If presently the condition determining unit has established that a preset intermediate position of the shutoff elements has been reached, the control element can shut off the current supply to the electric motor. The shutoff elements are then placed in the desired intermediate position.

By making the drive unit of self-braking design, the position of the shutoff elements in an intermediate position can be fixed in a simple manner.

Also, the control element may be configured such that if the motion condition of the drive element reaches a predetermined velocity or acceleration, for instance if the velocity falls below a particular value, or, for instance, if the acceleration corresponds to a pre-fixed reduction, this corresponds to the shutoff elements reaching the first or second position. In that case too, the control element can shut off the current supply to the electric motor.

An advantageous embodiment of the adjustment device provides that if the shutoff elements jam in an unexpected position, for instance due to an object, such as a branch or one or more fingers, hindering further adjustment of the shutoff elements even before one of the extreme positions or a preset intermediate position has been reached, the control element can advantageously shut off the current supply to the electric motor, before the object such as the branch or the fingers damage the shutoff elements. This can be done, for instance, by detecting that the shutoff strips brake strongly or by detecting that the position of the shutoff strips does not change or hardly so.

Alternatively or additionally, the control element can send the information about the motion condition of the reduction element as an output signal to a central control unit such as a board computer or a motor management unit. The central control unit may be provided with a control component which, depending on the received signal, determines whether or not the current supply to the electric motor of the adjustment device is to be shut off.

Also combinations of the above configurations and output signals to the central control unit are conceivable. Also, it may be so that the control element and/or the control of the central control unit is configured such that a particular position of the drive element corresponds to a particular intermediate position of the shutoff elements. Thus, also the intermediate positions of the shutoff elements are known. If presently the control element has established that a preset intermediate position of the shutoff elements has been reached, it can also send an output signal to the central control unit to shut off the current supply. Alternatively, the control element can send information about the position of the drive element to the central control unit, so that the control of the central control unit can determine whether the desired position of the shutoff elements has been reached to shut off the current supply. While in this case there is no direct danger of overloading of the electric motor and resultant damage, in this way also intermediate positions of the shutoff elements can be set relatively accurately and relatively reliably.

The condition determining unit can determine the condition of the drive element optically and/or electrically and/or magnetically and/or electromechanically. Other manners of detection are also possible. The detectable element can thus be an optical element and/or an electrical element and/or a magnetic element and/or an electromechanical element. The detection element is implemented as a detection sensor for detecting the detectable element and can thus be implemented for detecting an optical element and/or an electrical element and/or a magnetic element and/or an electromechanical element.

For instance, the drive element may be provided with at least one magnetic element, while the condition determining unit furthermore comprises a detection sensor for detecting the magnetic element. By, for instance, counting the number of passages of the magnetic element during a particular time, the condition, for instance the position, the velocity, or the acceleration, of the drive element can be determined. By providing the condition determining unit with at least two detection sensors, for instance, two Hall sensors, placed substantially behind one another, the condition determining unit can relatively simply detect the motion direction of the drive element. In a preferred embodiment, the drive element may be provided with a multiply polarized magnetic ring which comprises the at least one magnetic element. By placing the detection sensor on the radial position of the magnetic ring, the passages of the magnetic element can be counted in a reliable manner.

Alternatively, the condition of the drive element can be established optically. For instance, the drive element may be provided with at least one reflecting element. In a virtually equal radial position of the reflecting element, a light source and a detection sensor may then be set up, with the detection sensor detecting the light reflected by the reflecting element. By counting the reflections, the number of passages of the reflecting element can be counted, so that the position and/or the velocity and/or the acceleration and/or the direction of the reduction element can be determined. Also, via one or more light transmitting openings in the reduction element the light may be guided, as it were, in pulse form to a detection sensor.

Analogously, the condition of the drive element can be established electrically. For instance, the drive element may be provided with an electrically conductive element. By arranging a detection sensor, for instance a carbon brush, at a virtually equal radial distance from the conductive element, then, when contact is made with the conductive element a, possibly weak, current can be detected. In this way, the number of passages of the conductive element can be counted and from that the position and/or the velocity and/or the acceleration and/or the direction of the reduction element can be determined.

The condition determining unit can be implemented with all kinds of other detection sensors. Thus, a detection sensor for measuring electrical fields can be used, or a sensor for image recognition. These embodiments are not further elucidated here, since they may be considered well known to those skilled in the art.

Further advantageous embodiments are represented in the subclaims.

The invention furthermore relates to a method for adjusting shutoff elements of an air inlet of a motor compartment of a motor vehicle.

Figure 2:
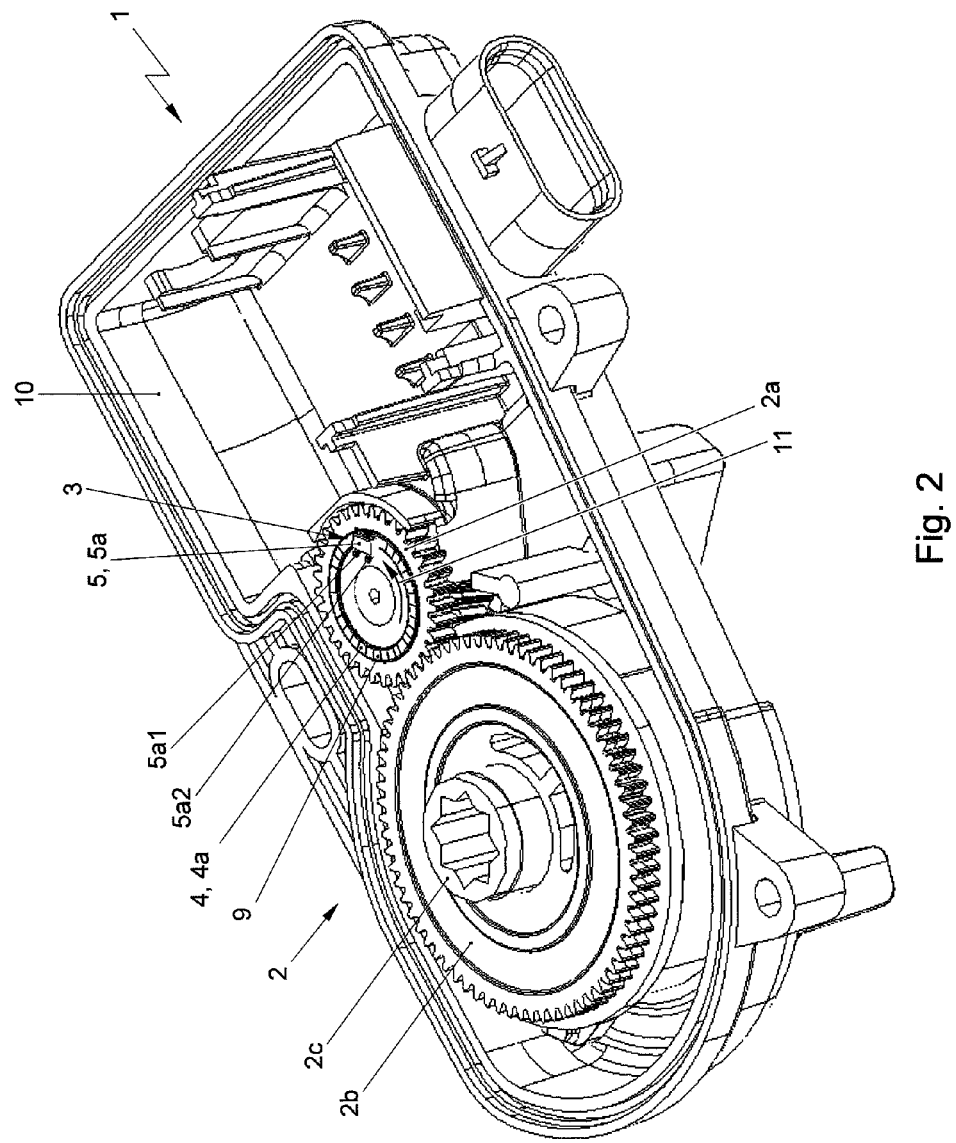

The invention will be elucidated in more detail on the basis of exemplary embodiments which are represented in the drawings. In the drawings:

FIG. 1 shows a schematic representation of the working of a condition determining unit according to the invention; and FIG. 2 shows a schematic perspective view of an adjustment device according to the invention.

It is noted that the drawing figures are only shown by way of schematic representations of exemplary embodiments of the invention and should not in any way be regarded as limiting. In the drawing figures, like or corresponding parts are denoted with like or corresponding reference numerals.

FIG. 1 shows a schematic representation of the working of a condition determining unit 3 according to the invention. The condition determining unit 3 is here used for determining a motion condition of a drive element 2a of an adjustment device 1 for adjusting shutoff elements 14. The drive element 2a whose motion condition is to be determined is here a reduction element 2a of a drive train 13 of the drive unit 2. Alternatively, the drive element 2a whose motion condition is to be determined can be another chive element 2b, 2c, such as the output shaft of an electric motor 12 of the drive unit 2 or an output shaft 2c of the drive unit 2.

The condition determining unit 3 comprises a detectable element 4. The detectable element 4 is here provided on or in the drive element 2a which is formed by the respective reduction element 2a. Alternatively, the detectable element 4 may be provided on or in another chive element, for instance, on or in another reduction element 2b, the output shaft of the electric motor 12, or the output shaft 2c of the drive unit 2.

Furthermore, the condition determining unit 3 comprises a detection element 5 for detecting the detectable element 4, and a control element 6. The detection element 5 is, for instance, a detection sensor 5.

During operation, the detection sensor 5 detects D the detectable element 4. The detection sensor 5 thereupon sends a signal S about the detection to the control element 6. The signal S comprises information about the motion condition of the detectable element 4, such as, for instance, information about a position, a motion velocity, a motion acceleration and/or a motion direction of the detectable element 4. The information about the motion condition of the detectable element 4 corresponds, for instance, to a motion condition of the drive element 2a provided with the detectable element 4, the motion condition comprising, for instance, a position, a motion velocity, a motion acceleration and/or a motion direction of the drive element 2a.

In the example shown, the control element 6 is designed to process the information and to establish the motion condition of the shutoff elements 14 on the basis of the signal S obtained from the detection sensor 5. To this end, for instance, the control element 6 can comprise a processor, preferably in the form of a CPU. Furthermore, the control element 6 is designed to determine whether the current supply E to the electric motor 12 is to be shut off. Also, the control element 6 is designed to shut off the current supply E to the electric motor 12 and to open it again if necessary.

Alternatively or additionally, the control element 6 is designed to send an output signal O to a central control unit 7 for controlling the adjustment unit 1, for instance via a LIN bus and/or, for instance, if the central control unit 7 so requires. The output signal O can comprise the information about the motion condition of the detectable element 4 and/or information about a motion condition of the shutoff elements. The central control unit 7 can be, for instance, a board computer or a motor management unit placed between a board computer and the adjustment unit 1. The central control unit 7 is designed to give the control element 6 an instruction to shut off or open the current supply E to the electric motor 12. Alternatively, the central control unit 7 may be designed, for instance, to shut off or open a direct current supply to the drive unit 2, itself.

Preferably, the control element 6 and/or the central control unit 7 is configured and/or set up such that a particular position of the drive element 2a corresponds to a particular end position or intermediate position of the shutoff elements 14. To this end, the control element 6 and/or the central control unit 7 may, for instance once, preferably before commencement of putting the condition determining unit 3 into use, be provided with information 8 about a relation between the motion condition of the drive element 2a and the motion condition of the shutoff elements 14. The information 8 can comprise, for instance, parameters which are filled in and/or programmed and/or configured in the control element 6 and/or the central control unit 7.

FIG. 2 shows a schematic perspective view of an adjustment device 1 according to the invention. The adjustment device 1 is suitable for adjusting shutoff elements of an air inlet of a motor compartment of a motor vehicle between at least a first position in which the air inlet is substantially closed and a second position in which the air inlet is substantially open. The adjustment device 1 comprises a drive unit 2, which comprises an output drive shaft 2c for driving the shutoff strips to be adjusted. The drive unit 2 here comprises furthermore a chive train 13 and an electric motor, not shown in FIG. 2, preferably a DC electric motor, for driving the drive train 13 coupled to it. The drive train 13 comprises at least one reduction element. In a preferred embodiment the drive train 13 can for instance comprise a compound planetary gear system, a cycloid drive system or a harmonic-drive drive system. Alternatively or additionally, the drive train 13 can comprise, for instance, a rack or another drive element which makes a non-rotary movement. The drive unit 2 comprises drive elements, such as an electric motor, or a reduction element 2a or an output drive shaft 2c, etc.

Here, the drive train 13 furthermore comprises a worm wheel, not shown, coupled to the electric motor. The worm wheel is coupled with a depicted first gear 2a of the drive train 13. The first gear 2a here forms a reduction element 2a for transmitting the speed of the output shaft of the electric motor in a manner so as to be at least partly reduced to the output drive shaft 2c of the drive unit 2. Although the reduction element 2a whose motion condition is to be determined can hence move in a rotary manner here, it is noted that the reduction element 2a whose motion condition is to be determined can alternatively make a different movement, for instance, a substantially linear or elliptical movement.

The adjustment device 1 is further provided with a condition determining unit 3 for determining a motion condition of the drive element 2a, which is here formed by the reduction element 2a in the form of the first gear 2a. Determining the motion condition of the drive element 2a can be done in all kinds of conventional manners, for instance, optically and/or electrically and/or magnetically.

The condition determining unit 3 here comprises, for instance, a detectable element 4 provided on the drive element 2a. Also, the condition determining unit 3 comprises a detection sensor 5. The detection sensor 5 is preferably substantially fixedly connected with the fixed world, for instance, by substantially fixing it to and/or with respect to a housing 10 of the adjustment device 1.

In the example shown, the detectable element 4 is provided in the form of a magnetic element 4a and the sensor 5 is provided in the form of a detection sensor 5a for detecting the magnetic element 4a. In the example shown, the detection sensor 5a comprises two juxtaposed sensors 5a1, 5a2, so that relatively simply the rotational direction of the magnetic element 4a and hence the rotational direction of the drive element 2a can be determined. In the example shown, the condition determining unit 3 detects the motion condition of the chive element 2a in a magnetic manner.

Preferably, the drive element 2a comprises several detectable elements 4. Here, the drive element 2a comprises, for instance, a multiply polarized magnetic ring 9 which comprises several magnetic elements 4a.

Alternatively, the condition determining unit 3 detects the motion condition of the drive element 2a in a different manner. To that end, the condition determining unit 3 may be designed, for instance, for determining the motion condition of the chive element 2a optically and/or electrically.

Referring to FIG. 1, the condition determining unit 3 can comprise in an exemplary embodiment an electrical detection sensor 5 for detecting an electrically detectable element, such as an electrically conductive element 4. The electrical detection sensor 5 can then comprise, for instance, one or a plurality of carbon brushes.

In an alternative embodiment, the drive element 2a is provided with one or more light transmitting elements 4, mirror elements 4, optically visible markings 4 or other provisions 4 that can be detected by light sensors or other optical detection sensors 5, such as cameras 5 or infrared sensors 5. The light-transmitting element 4 can comprise, for instance, a passage, indention or a transparent part of the drive element 2a.

By arranging for the detectable elements 4 to differ mutually and/or over their length and/or arranging for the mutual distance between the detectable elements 4 not to be constant, relatively simply a motion direction can be detected. To this end, the elements 4 can differ mutually and/or over their length, for instance, in shape, size, conductivity, magnetic force, reflectivity and/or translucence. It is noted that the length of the detectable elements 4 is understood to be the length viewed in a direction 11 in which the detectable elements 4 pass the detection sensor 5.

The invention is not limited to the exemplary embodiments represented above. Many variants are possible and will be clear to those skilled in the art. Such variants are understood to be within the scope of the following claims.

The invention claimed is:

1. An adjustment device for adjusting shutoff elements of an air inlet of a motor compartment of a motor vehicle between at least a first position in which the air inlet is substantially closed and a second position in which the air inlet is substantially open, wherein the adjustment device is provided with a drive unit comprising an electric motor and a drive train having drive elements, wherein the electric motor drives the drive train, wherein the adjustment device is furthermore provided with a condition determining unit for determining a motion condition of at least one of the drive elements, wherein the condition determining unit includes a control element for controlling the drive unit based on the determined motion condition.

2. The adjustment device according to claim 1, wherein the motion condition of the at least one drive element comprises at least one of a position, a motion velocity, a motion acceleration or a motion direction of the drive element.

3. The adjustment device according to claim 1, wherein the at least one drive element makes a rotating movement.

4. The adjustment device according to claim 1, wherein the condition determining unit comprises a detection element and a detectable element for determining the motion condition of the at least one drive element.

5. The adjustment device according to claim 4, wherein the detectable element comprises a magnetic element on the at least one drive element, and the detection element comprises a detection sensor for detecting the magnetic element.

6. The adjustment device according to claim 5, wherein a polarized magnetic ring comprises at least one magnetic element.

7. The adjustment device according to claim 1, wherein the condition determining unit is arranged for determining a motion condition of the at least one drive element implemented as reduction element.

8. A method for adjusting shutoff elements of an air inlet of a motor compartment of a motor vehicle, wherein the shutoff elements are adjustable between at least a first position in which the air inlet is substantially closed and a second position in which the air inlet is substantially open, the method comprising:

providing an adjustment device having a drive unit comprising an electric motor and a drive train having drive elements, wherein the electric motor drives the drive train, and a conditioning control unit comprising a condition determining unit and a control element;

adjusting the shutoff elements by the adjustment device;

determining, using the condition determining unit, a motion condition of at least one of the drive elements; and controlling the drive unit using the control element based on the determined motion condition.

* * * * *